(12) United States Patent
Garcia Navarro

(10) Patent No.: US 9,838,734 B2
(45) Date of Patent: Dec. 5, 2017

(54) SYSTEMS AND METHODS FOR CUSTOMIZED PREVIEW VIDEOS

(71) Applicant: EchoStar Technologies L.L.C., Englewood, CO (US)

(72) Inventor: Carlos Garcia Navarro, Boulder, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 11 days.

(21) Appl. No.: 14/108,703

(22) Filed: Dec. 17, 2013

(65) Prior Publication Data

US 2015/0172748 A1    Jun. 18, 2015

(51) Int. Cl.

| | | |
|---|---|---|
| H04N 21/8549 | (2011.01) | |
| H04N 21/434 | (2011.01) | |
| H04N 5/445 | (2011.01) | |
| H04N 21/25 | (2011.01) | |
| H04N 21/466 | (2011.01) | |

(Continued)

(52) U.S. Cl.
CPC ..... *H04N 21/4345* (2013.01); *H04N 5/44543* (2013.01); *H04N 21/252* (2013.01); *H04N 21/44222* (2013.01); *H04N 21/458* (2013.01); *H04N 21/4532* (2013.01); *H04N 21/4667* (2013.01); *H04N 21/4668* (2013.01); *H04N 21/8549* (2013.01); *H04N 21/2668* (2013.01)

(58) Field of Classification Search
CPC ......... H04N 21/25891; H04N 21/4532; H04N 21/252; H04N 21/8549; H04N 21/458; H04N 21/25; H04N 21/251; H04N 21/45; H04N 21/466; H04N 21/4668; H04N 21/4826; H04N 21/431; H04N 5/93; H04N 21/4756; H04N 21/482; H04N 21/812

USPC ........................................................ 725/41
See application file for complete search history.

(56) References Cited

U.S. PATENT DOCUMENTS 5,710,970 A * 1/1998 Walters et al. ................. 725/87
5,945,987 A * 8/1999 Dunn ............................ 715/718

(Continued)

OTHER PUBLICATIONS

Bais, Michel et al., Customized Television: Standards Compliant Advanced Digital Television, IEEE Transactions on Broadcasting, vol. 48, No. 2, Jun. 2002, pp. 151-158.*

*Primary Examiner* — Nathan Flynn
*Assistant Examiner* — Cynthia Fogg
(74) *Attorney, Agent, or Firm* — Kilpatrick Townsend & Stockton LLP

(57) ABSTRACT

Various arrangements are presented for creating a customized preview video. A television receiver may compile viewing statistics based on a plurality of pieces of content output for presentation. The viewing statistics can include an amount of time spent outputting for presentation each piece of content of the plurality of pieces of content. The television receiver, based on the viewing statistics for the plurality of pieces of content output for presentation, may determine one or more preferred content types and one or more preferred content genres. Using stored electronic programming guide data, a plurality of scheduled content instances may be determined based on the one or more preferred content types and one or more preferred content genres. A plurality of preview clips corresponding to the plurality of scheduled content instances may be accessed. The plurality of preview clips may be assembled to create the customized preview video.

16 Claims, 6 Drawing Sheets

(51) Int. Cl.
*H04N 21/442* (2011.01)
*H04N 21/45* (2011.01)
*H04N 21/458* (2011.01)
*H04N 21/2668* (2011.01)

(56) References Cited

U.S. PATENT DOCUMENTS

| | | | |
|---|---|---|---|
| 6,701,528 B1* | 3/2004 | Arsenault et al. | 725/89 |
| 8,255,953 B1* | 8/2012 | Rowson et al. | 725/47 |
| 2002/0040476 A1* | 4/2002 | Whitehead | H04N 5/44543 725/39 |
| 2002/0095689 A1* | 7/2002 | Novak | 725/151 |
| 2002/0129371 A1* | 9/2002 | Emura | G07F 17/0014 725/61 |
| 2002/0129375 A1* | 9/2002 | Kim et al. | 725/100 |
| 2002/0188947 A1* | 12/2002 | Wang | H04N 5/44543 725/45 |
| 2003/0149975 A1* | 8/2003 | Eldering et al. | 725/34 |
| 2004/0226042 A1* | 11/2004 | Ellis | 725/43 |
| 2005/0038877 A1* | 2/2005 | Gupta et al. | 709/219 |
| 2005/0204384 A1* | 9/2005 | Yuen | H04N 5/44543 725/43 |
| 2006/0010467 A1* | 1/2006 | Segel | 725/34 |
| 2006/0239644 A1* | 10/2006 | Barbieri | G06F 17/30796 386/226 |
| 2008/0256129 A1* | 10/2008 | Salinas et al. | 707/104.1 |
| 2009/0019488 A1* | 1/2009 | Ruiz-Velasco et al. | 725/43 |
| 2009/0031336 A1* | 1/2009 | Chavez et al. | 725/24 |
| 2009/0052863 A1* | 2/2009 | Parmar | G11B 27/034 386/323 |
| 2009/0228919 A1* | 9/2009 | Zott et al. | 725/34 |
| 2012/0141095 A1* | 6/2012 | Schwesinger et al. | 386/290 |
| 2012/0163761 A1* | 6/2012 | Minamino | H04N 21/4223 386/224 |
| 2013/0042271 A1* | 2/2013 | Yellin et al. | 725/41 |
| 2015/0172787 A1* | 6/2015 | Geramifard | H04N 21/8549 725/40 |

* cited by examiner

| Event name | Type | Total minutes | Genre 1 | Genre 2 | Genre 3 | Actor 1 | Actor 2 | Director |
|---|---|---|---|---|---|---|---|---|
| Breaking Bad | Series | 820 | Crime | Drama | Thriller | Bryan Cranston | Anna Gunn | Vince Gilligan |
| Friends | Series | 403 | Comedy | Romance | -- | Jennifer Aniston | Matthew Perry | David Crane |
| Go on | Series | 215 | Comedy | -- | -- | Matthew Perry | Laura Benanti | Scott Silveri |
| The Matrix Reloaded | Movie | 138 | Action | Adventure | Sci-Fi | Keanu Reeves | Hugo Weaving | Andy Wachowski |
| The Matrix | Movie | 136 | Action | Adventure | Sci-Fi | Keanu Reeves | Hugo Weaving | Andy Wachowski |
| V for Vendetta | Movie | 132 | Action | Crime | Fantasy | Natalie Portman | Hugo Weaving | James McTeigue |

FIG. 3

| Type | Total minutes | Start Time | End Time | Total |
|---|---|---|---|---|
| Series | 1438 | 09/01/2013 | 09/23/2013 | 76% |
| Movies | 406 | 09/01/2013 | 09/23/2013 | 21.5% |
| Live Events | 45 | 09/01/2013 | 09/23/2013 | 2.5% |

FIG. 4

| Genre | Total minutes | Start Time | End Time | Total |
|---|---|---|---|---|
| Crime | 952 | 09/01/2013 | 09/23/2013 | 22.18% |
| Drama | 820 | 09/01/2013 | 09/23/2013 | 19.10% |
| Thriller | 820 | 09/01/2013 | 09/23/2013 | 19.10% |
| Comedy | 618 | 09/01/2013 | 09/23/2013 | 14.40% |
| Romance | 403 | 09/01/2013 | 09/23/2013 | 9.39% |
| Adventure | 274 | 09/01/2013 | 09/23/2013 | 6.38% |
| Sci-Fiction | 274 | 09/01/2013 | 09/23/2013 | 6.38% |
| Fantasy | 132 | 09/01/2013 | 09/23/2013 | 3.07% |

FIG. 5

SYSTEMS AND METHODS FOR CUSTOMIZED PREVIEW VIDEOS

BACKGROUND

When a television user is determining what upcoming television programming to watch and/or record, the user may have limited options. One option is to flip through an electronic programming guide (EPG) that lists a schedule of upcoming television programming. While such an arrangement may allow a user to learn about what upcoming television programming is scheduled, the user may tend to focus on titles of television programs that the user recognizes. Further, browsing through text may be of little interest to the user. Another option is for the user to look over a television service provider's popularity lists. Some television service providers provide a television user with access to one or more lists that indicate the most popular television programs. While these listed television programs may be the most popular across a broad base of users, the lists may not necessarily be indicative of interesting television programming to the particular television user.

SUMMARY

In some embodiments, a television receiver for creating a customized preview video is presented. The television receiver may include one or more processors. The television receiver may include a memory communicatively coupled with and readable by the one or more processors. The memory may have stored therein processor-readable instructions which, when executed by the one or more processors, cause the one or more processors to compile viewing statistics based on a plurality of television programs output for presentation. The viewing statistics may include an amount of time spent outputting for presentation each television program of the plurality of television programs. The instructions may cause the one or more processors to determine, based on an event, to create the customized preview video. The instructions may cause the one or more processors to determine, based on the viewing statistics for the plurality of television programs output for presentation, one or more preferred content types and one or more preferred content genres. The instructions may cause the one or more processors to identify using stored electronic programming guide data, a plurality of scheduled television programs, based on the one or more preferred content types and the one or more preferred content genres. The instructions may cause the one or more processors to access a plurality of preview clips corresponding to the plurality of scheduled television programs. The instructions may cause the one or more processors to assemble the plurality of preview clips to create the customized preview video.

Embodiments of such a television receiver may include one or more of the following: The event may be a request received from a user and/or based on a predefined schedule. The instructions may cause the one or more processors to download the plurality of preview clips from a remote preview host. The processor-readable instructions that cause the one or more processors to access the plurality of preview clips may include processor-readable instructions which, when executed, cause the one or more processors to record the plurality of preview clips via a tuner of the television receiver prior to determining to create the customized preview video. The one or more preferred content types may be selected from the group consisting of: series, movies, and live events. The processor-readable instructions, when executed, may cause the one or more processors to output the customized preview video for presentation. The instructions may cause the one or more processors to, while the customized preview video is being output for presentation, process a record command received from a remote control. The instructions may cause the one or more processors to identify a television program corresponding to a preview clip of the plurality of preview clips currently being output for presentation. The instructions may cause the one or more processors to create a timer to record the television program based on the stored electronic programming guide data.

In some embodiments, a method for creating a customized preview video is presented. The method may include compiling, by a television receiver, viewing statistics based on a plurality of television programs output for presentation. The viewing statistics may include an amount of time spent outputting for presentation each television program of the plurality of television programs. The method may include determining, by the television receiver, based on an event, to create the customized preview video. The method may include determining, by the television receiver, based on the viewing statistics for the plurality of television programs output for presentation, one or more preferred content types and one or more preferred content genres. The method may include identifying, by the television receiver, using stored electronic programming guide data, a plurality of scheduled television programs, based on the one or more preferred content types and the one or more preferred content genres. The method may include accessing, by the television receiver, a plurality of preview clips corresponding to the plurality of scheduled television programs. The method may include assembling, by the television receiver, the plurality of preview clips to create the customized preview video.

Embodiments of such a method may include one or more of the following: the event may be a request received from a user and/or based on a predefined schedule. Accessing, by the television receiver, the plurality of preview clips may include downloading, by the television receiver, the plurality of preview clips from a remote preview host. Accessing, by the television receiver, the plurality of preview clips may include recording, by the television receiver, the plurality of preview clips via a tuner of the television receiver prior to determining to create the customized preview video. The one or more preferred content types may be selected from the group consisting of: series, movies, and live events. The method may include outputting, by the television receiver, the customized preview video for presentation. The method may include, while the customized preview video is being output for presentation, receiving, by the television receiver, a record command. The method may include identifying, by the television receiver, a television program corresponding to a preview clip of the plurality of preview clips currently being output for presentation. The method may include creating, by the television receiver, a timer to record the television program based on the stored electronic programming guide data.

In some embodiments, a non-transitory processor-readable medium for creating a customized preview video is presented. The non-transitory processor-readable medium may include processor-readable instructions configured to cause one or more processors to compile viewing statistics based on a plurality of television programs output for presentation by a television receiver. The viewing statistics may include an amount of time spent outputting for presentation each television program of the plurality of television programs. The instructions may be configured to cause the one or more processors to determine, based on an event, to create the customized preview video. The instructions may be configured to cause the one or more processors to determine, based on the viewing statistics for the plurality of television programs output for presentation, one or more preferred content types and one or more preferred content genres. The instructions may be configured to cause the one or more processors to identify using stored electronic programming guide data, a plurality of scheduled television programs, based on the one or more preferred content types and the one or more preferred content genres. The instructions may be configured to cause the one or more processors to access a plurality of preview clips corresponding to the plurality of scheduled television programs. The instructions may be configured to cause the one or more processors to assemble the plurality of preview clips to create the customized preview video.

Embodiments of such a non-transitory processor-readable medium may include one or more of the following: The processor-readable instructions configured to cause the one or more processors to access the plurality of preview clips may include processor-readable instructions configured to cause the one or more processors to record the plurality of preview clips via a tuner of the television receiver prior to determining to create the customized preview video. The processor-readable instructions may be further configured to cause the one or more processors to output the customized preview video for presentation. The instructions may be configured to cause the one or more processors to, while the customized preview video is being output for presentation, process a record command received from a remote control. The instructions may be configured to cause the one or more processors to identify a television program corresponding to a preview clip of the plurality of preview clips currently being output for presentation. The instructions may be configured to cause the one or more processors to create a timer to record the television program based on the stored electronic programming guide data.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an embodiment of a table for organizing viewing statistics.

FIG. 4 illustrates an embodiment of a table for analyzed viewing statistics.

FIG. 5 illustrates another embodiment of a table for analyzed viewing statistics.

DETAILED DESCRIPTION

Rather than a television user browsing through the text of an electronic programming guide, consulting a television service provider's listing of most popular television programs, a customized preview video can be created for the television user. The customized preview video can be created by a television receiver (e.g., a set top box). The customized preview video can be based upon viewing statistics that are specific to the television user. Therefore, based upon the user's historical television viewing habits, a customized preview video can be created. The customized preview video may include clips of television programs that are scheduled to be broadcast (or otherwise made available) during an upcoming predefined time period (e.g., the next week).

Viewing statistics for the user may be used to determine the types of television programming (e.g., series, movie, live event), the genre of television programming (e.g., drama, comedy, documentary), and/or other characteristics of television programming that are likely to be preferable to the user. Using the determined types of television programming, the genre of television programming, and/or other characteristics, multiple pieces of content scheduled to be available within the upcoming predefined time period may be identified that are likely to be preferable to the user. For each of these pieces of content, a video clip may be obtained. A compilation of the video clips may be created. This compilation of video clips may be stored and then viewed by the user as a single customized preview video. By the user viewing the customized preview video, the user can view a compiled set of clips of television programs that the user can be expected to desire to watch based on the user's viewing history.

Figure 1:
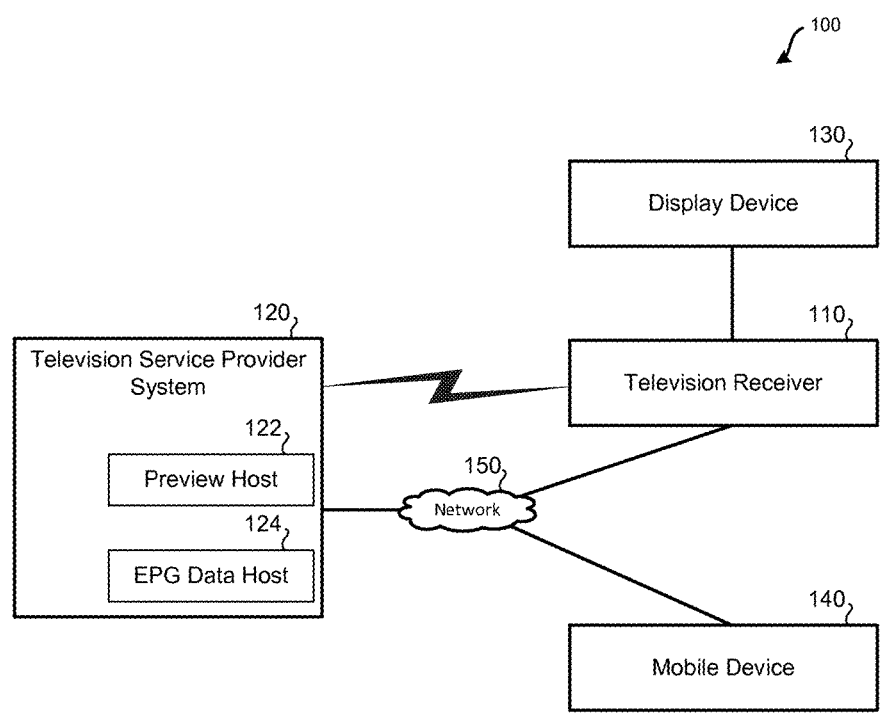
FIG. 1 illustrates an embodiment of a system configured to create a customized preview video.

FIG. 1 illustrates an embodiment of a system 100 configured to create a customized preview video. System 100 may include: television receiver 110, television service provider system 120, display device 130, mobile device 140, and network 150. In other embodiments, a fewer or a greater number of components may be present. Television receiver 110 may be a device that allows a television service subscriber to receive television programming from a television service provider. Television receiver 110 may be a stand-alone device, such as a set top box (STB), which can be connected with a display device. Television receiver 110 may also be integrated with a display device. For instance, television receiver 110 may be in the form of circuitry that is incorporated as part of display device 130. This circuitry may allow television programming broadcast by television service provider system 120 to the stored and/or presented to user.

Television receiver 110 may be configured to receive television programming from television service provider system 120 via various types of television service provider networks. In some embodiments, one or more satellites may be used to relay television programming and other data from television service provider system 120 to television receiver 110. In other embodiments, television receiver 110 may be configured to receive television programming via a cable or IP-based television service provider network from television service provider system 120. Television receiver 110 may also be in communication with display device 130. Television receiver 110 may be configured to decode video and/or audio and output such video and audio to a display device 130 for presentation to one or more users. Display device 130 may represent a television or some other form of device configured to output video for viewing by a user, such as a monitor, projector, etc.

Television service provider system 120 may broadcast television programming to a plurality of television receivers, including television receiver 110. The television programming broadcast by television service provider system 120 may include broadcasts of multiple television channels and on-demand content. Television service provider system 120 may also broadcast (e.g., via satellite, cable, or an IP-based network) electronic programming guide (EPG) data from EPG data host 124. EPG data may include scheduling information for the broadcast of one or more television channels during an upcoming period of time. For example, EPG data may include broadcast time periods and channels for upcoming broadcasts of television programming. EPG data may also include characteristics of each of the scheduled television programs. Such characteristics may include: a type of program (e.g., series, movie, live event), a genre of program (e.g., comedy, drama, sci-fi, etc.), a rating (e.g., G, PG, PG-13, R), an indication of the names of at least some appearing actors/actresses, and/or an indication of the director who directed the show. Other types of characteristics are also possible in other embodiments. EPG data from EPG data host 124 may be transmitted by a television service provider system 120 to television receiver 110, via the television service provider's network, which can be a satellite-based network, a cable-based network, or an IP-based network. In some embodiments, EPG data from EPG data host 124 may also be transmitted to television receiver 110 via network 150. Network 150 may represent the Internet. Therefore, while television service provider system 120 may broadcast television programming via a first network to television receiver 110, a second network, such as network 150, may be used to provide other data to television receiver 110.

Television service provider system 120 may include preview host 122. Preview host 122 may create and/or store preview video clips for various pieces of content scheduled to be broadcast to television receiver 110. In some embodiments, preview host 122 may store a preview clip for each piece of content indicated by EPG data host 124 that is scheduled to be broadcast. For instance, preview host 122 may store a preview clip for each piece of content scheduled to be broadcast on some or all television channels within the next week, next two weeks, etc. Preview host 122 may distribute preview clips to various television receivers, including television receiver 110 in various ways. In some embodiments, television service provider system 120 may broadcast preview clips in the form of a television channel. Therefore, for example, if a television service provider system 120 broadcasts television channels to television receiver 110 via satellite, clips may be transmitted by preview host 122 via a separate television channel of the same satellite-based distribution system. Therefore, television receiver 110 may record such preview clips similarly to how a television channel would be recorded by television receiver 110. In addition to storing preview clips for television programming scheduled to be broadcast, preview host 122 may store preview clips for content that will be or is otherwise available to television receiver 110. For instance, preview host 122 may store preview clips for on-demand content, which may be stored locally by television receiver 110 or may be retrieved when desired by a user of television receiver 110.

In some embodiments, network 150 may be used by preview host 122 of television service provider system 120 to provide preview clips to television receiver 110. In such embodiments, television receiver 110 may request preview clips for particular television programs. As such, network 150 may be used to retrieve only preview clips that are to be incorporated as part of a customized preview video from preview host 122. Therefore, in such embodiments, while television receiver 110 may receive broadcast television programming via a satellite-based distribution system, preview clips may be requested and obtained via network 150 from preview host 122 of television service provider system 120.

In some embodiments, rather than clips being created and stored by preview host 122 of television service provider system 120, television receiver 110 may create such clips. To create such clips, television receiver 110 may record an entire television program and excerpt certain portions to create a preview clip. The ports of the television program excerpted to create the preview clip may be based on preview metadata included with (or received after) the broadcast of the television program. For example, if a television program is thirty minutes long (i.e., runs from 0:00 to 30:00), metadata may indicate that a preview clip can be created for the television program by using 0:15-0:23, 11:17-12:01, and 15:55-16:11. Such an arrangement may be particularly useful where the content is going to be stored by television receiver 110 before it is available for viewing. For instance, on-demand content may be distributed via a satellite-based television distribution network to television receivers. Television receiver 110, using such preview metadata, may create a preview clip for the piece of content.

Television receiver 110 may be configured to create a customized preview video using preview clips either obtained from preview host 122 or created locally by television receiver 110. The customized preview video may be output for presentation to the user via a display device 130. It may also be possible to view the customized preview video via another device. For instance, mobile device 140, which may be linked with a user's account (which is also linked with television receiver 110) may access the customized preview video via network 150. Mobile device 140 may be a cellular phone, tablet computer, laptop computer, or some other form of computerized device. Therefore, while the customized preview video may be created and stored by television receiver 110, the customized preview video may be presented to the user via multiple different devices. As such, the customized preview video may be accessed from a device that is convenient to the user.

Figure 2:
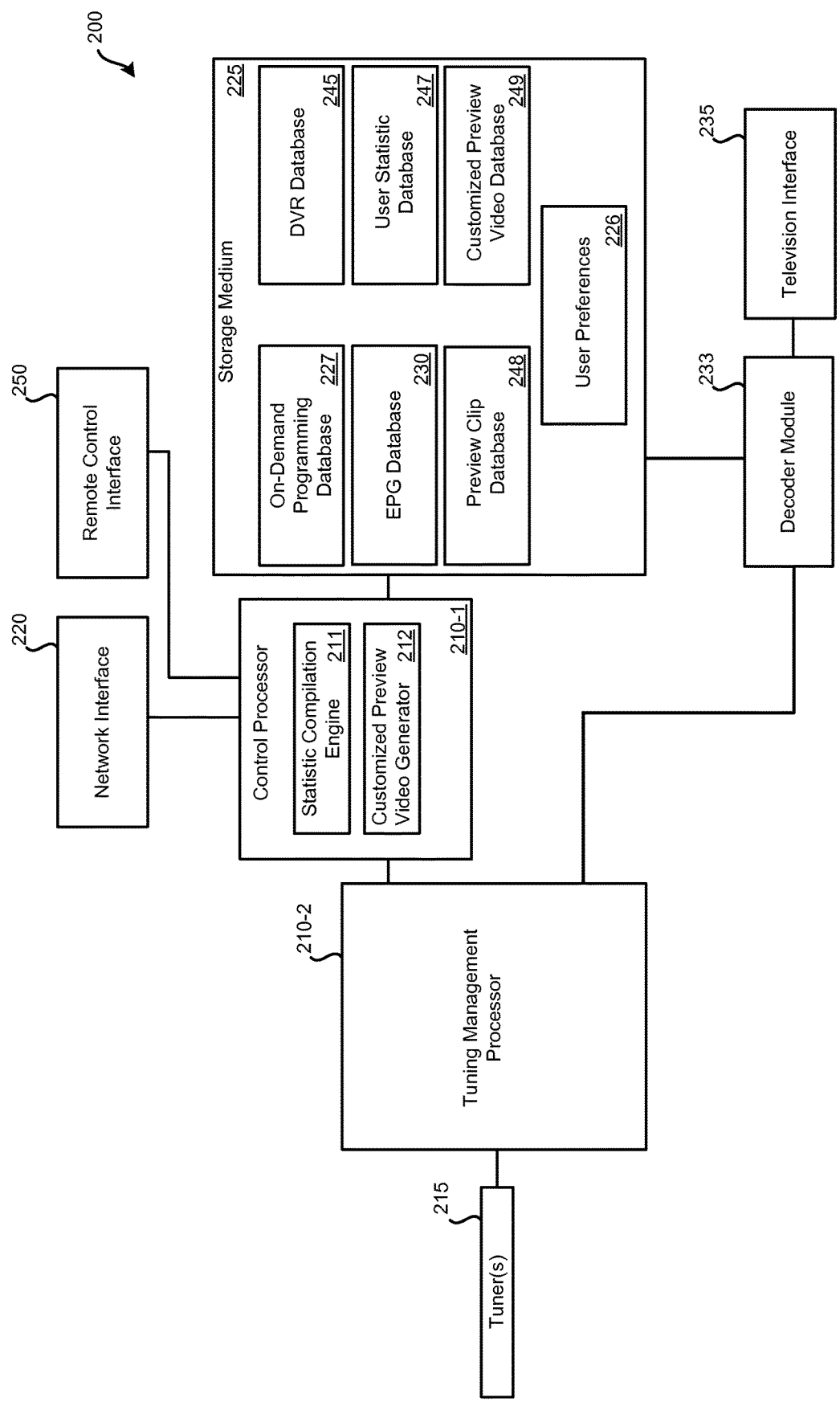
FIG. 2 illustrates an embodiment of a television receiver configured to create a customized preview video.

FIG. 2 illustrates an embodiment of a television receiver 200 configured to create a customized preview video. Television receiver 200 may represent an embodiment of television receiver 110 of FIG. 1. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 200 may be incorporated as part of a television, such as display device 130 of FIG. 1. Television receiver 200 may include: processors 210 (which may include control processor 210-1, tuning management processor 210-2, and possibly additional processors), tuners 215, network interface 220, non-transitory computer-readable storage medium 225, on-demand programming database 227, electronic programming guide (EPG) database 230, television interface 235, digital video recorder (DVR) database 245 (which may include provider-managed television programming storage and/or user-defined television programming), preview clip database 248, user statistic database 247, customized preview video database 249, and/or remote control interface 250. In other embodiments of television receiver 200, fewer or greater numbers of components may be present. It should be understood that the various components of television receiver 200 may be implemented using hardware, firmware, software, and/or some combination thereof.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and remote control interface 250. Control processor 210-1 may handle incoming data from network interface 220 and remote control interface 250. Additionally, control processor 210-1 may be configured to output data via network interface 220.

Control processor 210-1 may include statistic compilation engine 211 and customized preview video generator 212. Statistic compilation engine 211 and customized preview video generator 212 may represent software executed by control processor 210-1. It should be understood that statistic compilation engine 211 and customized preview video generator 212 may be executed in the form of specialized hardware or firmware.

Statistic compilation engine 211 of control processor 210-1 may be configured to monitor the viewing habits of a user viewing television programming output via television interface 235. Statistic compilation engine 211 may monitor the amount of time for which particular pieces of content are output for presentation. Such statistics may be monitored by statistic compilation engine 211 on the user-by-user basis. Therefore, separate statistics may be maintained for separate users of television receiver 200. In other embodiments, a single set of statistics may be maintained for all users of the television receiver. For example, not only would statistic compilation engine 211 store an indication that a particular television series is viewed by a user, the statistic compilation engine 211 may maintain an indication of the total amount of time for which the particular television series has been viewed. This total amount of time may be within a defined time period, such as within the last 3 months. Statistic compilation engine 211 may also cause to be stored information derived from the EPG data for each television program viewed by the user. Therefore, information such as the type of television program, the genre of television program, actors and/or actresses, and the director involved in producing the television program may be stored if the user has viewed the television program. The statistic compilation engine 211 may store such data to user statistic database 247 of storage medium 225. Further detail regarding the data stored to user statistic database 247 is provided in relation to FIG. 3.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information for EPG database 230, DVR database 245, on-demand programming 227, user statistic database 247, preview clip database 248, customized preview video database 249, and/or user preferences 226.

Preview clip database 248 of storage medium 225 may be used to store preview clips. Preview clips stored to preview clip database 248 may be requested and received via network interface 220 and/or may be received via tuners 215. For example, on one or more particular channels, preview clips may be spooled by a television service provider. Control processor 210-1 may cause some or all preview clips to be received via tuners 215 and recorded to preview clip database 248. Control processor 210-1 may also request and receive particular preview clips via network interface 220. The preview clips that are received may be stored to preview clip database 248. In some embodiments, preview clips created locally by television receiver 200 may be stored to preview clip database 248. Such preview clips may be created using portions of a television program from DVR database 245 or on-demand programming database 227. Such preview clips may be created using metadata as previously detailed.

User preferences 226 may be used to store preferences related to customize preview video generation. For instance, via user preferences 226, a user may be permitted to specify that the generated customized preview video be at or below a particular rating (e.g., PG or less). User preferences 226 may also be customized by a user to indicate specifics of television programming that the user enjoys. Rather than relying on user statistics compiled by statistic compilation engine 211, explicit settings by the user may be used to determine how to create a customize preview video. For example, a user could specify that he is only interested in series and not movies or sports. The user can also specify particular actors, actresses, and/or directors that the user is or is not interested in. The user can also specify one or more genres of content that the user is or is not interested in. Other forms of user preferences are also possible. Control processor 210-1 may present a visual interface that allows a user to modify user preferences 226, using an input device, such as via remote control interface 250.

Customized preview video generator 212 may access user statistic database 247, user preferences 226, EPG database 230, and preview clip database 248 to create one or more customized preview videos. Customized preview videos may be of varying lengths depending on the number of preview clips to be included. For example, if each preview clip is 30 seconds to 1 min., and the customized preview videos include the previews for ten television programs, the customized preview video may be approximately five to ten minutes in length. Customized preview video generator 212 may use data from user statistic database 247, user preferences 226, EPG database 230, and preview clip database 248 as detailed in relation to FIGS. 3-6 to create a customized preview video.

A customized preview video may be stored to customized preview video database 249. At a given time a single customized preview video may be stored. Via user preferences, the user may be able to define the number of preview videos stored. Customized preview videos may be stored in customized preview video database 249 as space permits. For instance, storage medium 225 may have some defined amount of space devoted to customized preview videos. In some embodiments, a customized preview video may be stored as a listing of preview clip references rather than as a video itself. When played, the customized video file may be accessed to determine which video clip from preview clip database 248 should be played next. From a user's point of view, it may appear that a single customized video is being played; however, multiple files may be output consecutively for presentation.

Tuners 215 may include one or more tuners used to tune to transponders that include broadcasts of one or more television channels. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Tuners 215 may also be used to receive EPG data and preview clips.

Network interface 220 may be used to communicate with a television service provider system (e.g., television service provider system 120 of FIG. 1), if a network connection is available. The primary communication channel may be via satellite (which may be unidirectional to television receiver 200) and the alternate communication channel (which may be bidirectional) may be via a network, such as the Internet. Data may be transmitted from television receiver 200 to a television service provider system and from the television service provider system to television receiver 200. Information may be transmitted and/or received via network interface 220. For instance, preview clips may be requested and received via network interface 220. Also, if a mobile device is in communication with television receiver 200, a customized preview video may be output to the mobile device via network interface 220.

Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers. DVR database 245 may be used to store television programs that were broadcast to the television receiver and received via a tuner of tuners 215. A timer may have been configured by either a user of television receiver 200 or by the television service provider to cause television receiver 200 to record a television program to DVR database 245. Such a timer may be recurring. Therefore, a timer may repeat on the same channel weekly.

EPG database 230 may store information related to television channels and the timing of programs appearing on such television channels. EPG database 230 may be stored using storage medium 225, which may be a hard drive or solid-state drive. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider (e.g., a cable network). Updates to EPG database 230 may be received periodically. EPG data, received from EPG data host 124, may include information on television programming scheduled to be broadcast. For each television program, at least some of the following information may be stored: a television channel, a date, a time period, a description, a type, one or more associated genres, a rating, a listing of one or more actors/actresses, and/or an indication of a director. EPG data from EPG database 230 may be used in conjunction with user statistic database 247 to determine television programming likely to be desired by a user. In addition to EPG data being stored for television programming to be broadcast, relevant EPG data may be stored for on-demand content and/or recorded content. At least some EPG data may be retained for television programming that has been indicated as viewed in user statistic database 247.

Decoder module 233 may serve to convert encoded video and audio into a format suitable for output to a display device. For instance, decoder module 233 may receive MPEG video and audio from storage medium 225 or tuning management processor 210-2 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or from tuning management processor 210-2, simultaneously. For instance, decoders within decoder module 233 may be able to only decode a single television channel at a time. Decoder module 233 may have various numbers of decoders.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite.

As an example of DVR functionality of television receiver 200 being used to record, based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming database 227 may store additional television programming. On-demand programming database 227 may include television programming that was not recorded to storage medium 225 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider.

Remote control interface 250 may receive communications from a remote control (physically separate from television receiver 200) that allows a user to interact with television receiver 200. Remote control interface 250 may receive and send received commands to control processor 210-1, which may then process the commands. In some embodiments, it may be possible to load some or all preferences to a remote control. As such, the remote control can serve as a backup storage device for the preferences. In such embodiments, the communication link with the remote control via remote control interface 250 is bidirectional.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. Video and/or audio may be output to storage medium 225 for storage (e.g., in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 800 of FIG. 8.

While the television receiver 200 has been described primarily as a satellite receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations.

FIG. 3 illustrates an embodiment of a table 300 for organizing viewing statistics. Table 300 may represent how user statistic database 247 of FIG. 2 stores data produced by statistic compilation engine 211. Table 300 represents a possible embodiment of how such data may be stored. It should be understood that user statistic database 247 may store similar data in other formats. Table 300 may include: event name 310, type 320, total minutes 330, genre one 340, genre two 350, genre three 360, actor one 370, actor two 380, and director 390. It should be understood that these are exemplary forms of data which may be stored in table 300; other embodiments of table 300 may include fewer or greater categories of data.

Event name 310 may indicate the name of the television programming for which statistics were collected based on the user requesting such television programming be output for presentation. For each instance of television programming, type 320 may be indicated. Type 320 may indicate whether an instance of television programming is a series, a movie, a live event (e.g., sports, concert), or some other type. Total minutes 330 may indicate an amount of time has been spent watching the television program. For television programming that is part of a series, total minutes 330 may correspond to the amount of time the user has spent watching the entire series (not a single episode). Genre one 340, genre two 350, and genre three 360 may indicate one or more genres associated with the television programming, such as comedy, crime, drama, thriller, romance, action, adventure, sci-fi, fantasy, etc. Actors one 370 and actors two 380 may indicate the leading actors and/or actresses appearing in the television programming. Director 390 may indicate the director who directed the television programming.

Table 300 may include an entry for all television programming that was viewed by the user. In some embodiments, a threshold minimum time may be required for total minutes 330 for an entry to be maintained. For instance, if a user has not watched an instance of television programming for at least twenty minutes, no entry may be maintained in table 300. While total minutes 330 is expressed in minutes, other units of time may also be used.

Table 300 may be sorted using total minutes 330 to determine how much a user likes television programming with particular characteristics.

FIG. 4 illustrates an embodiment of a table 400 of analyzed viewing statistics. Upon an event occurring (e.g., a user request, a predefined date/time occurring), the information of table 300 may be used to create analyzed viewing statistics, such as those presented in table 400. Table 400 represents a possible embodiment of how such data may be stored. It should be understood that data presented in table 400 may also be stored in other formats. Table 400 may include: type 410, total minutes 420, start time 430, end time 440, and total percentage 450. It should be understood that these are exemplary forms of data which may be created and stored in table 400; other embodiments of table 400 may include fewer or greater categories of data.

Table 400 may be created by analyzing table 300. The illustrated embodiment of table 400 represents the television programming viewed by the user organized by type 410, which corresponds to type 320 of table 300. The entries of table 400 are ranked, based on the total minutes 420 that the television receiver was outputting such television programming. For instance, the top three entries in table 300 are each a series. Therefore, each of these television programs' total minutes values from total minutes 330 are added together. A summation for type series is created; a summation for type movie is created, as well as a summation for type live event (from events not listed in the abbreviated exemplary table of FIG. 3). If other types are present, additional summations of total minutes may be created. Based on the summations, it can be seen in table 400 that the user prefers series over movies, but prefers movies over live events.

Table 400 was created for the time period of start time 430 to end time 440. Over time, as a user's likes and dislikes change, the user's determined preference for series, movies, live events may update. In the example of table 400, the time period used for the analyzed statistics is about three weeks. A total percentage 450 may be calculated. Total percentage may be used to determine how much a user prefers a particular programming type. For instance, if a total percentage for a type of series is 90%, that may indicate a very strong preference for series than if the percentage was 50%. Total percentage 450 may be computed using the total minutes 420 value for each type.

FIG. 5 illustrates another embodiment of a table 500 for analyzed viewing statistics. Upon an event occurring (e.g., a user request, a predefined date/time occurring), the information of table 300 may be used to create analyzed viewing statistics, such as those presented in table 500. Table 500 represents a possible embodiment of how such data may be stored. It should be understood that data presented in table 500 may also be stored in other formats. Table 500 may include: genre 510, total minutes 520, start time 530, end time 540, and total percentage 550. It should be understood that these are exemplary forms of data which may be created and stored in table 500; other embodiments of table 500 may include fewer or greater categories of data.

Table 500 may be created by analyzing table 300. The illustrated embodiment of table 500 represents the television programming viewed by the user organized by genre 510 (instead of type 410), which corresponds to genre one 340, genre two 350, and genre three 360 of table 300. If television programming contains an indication of a genre, it may be included in a summation of total time spent viewing that genre of content. The entries of table 500 are ranked based on the total minutes 520 that the television receiver was outputting such a genre of television programming. For instance, the first and last entries in table 300 are each associated with a crime genre. Therefore, each of these television programs' total minutes value from total minutes 330 are added together for statistics on the genre of crime. A summation based on total minutes is created for each genre and may be ranked according to total minutes 520 if table 500. Therefore, based on genre, the user prefers crime, then drama, then thrillers, etc.

Table 500 was created for the time period of start time 530 to end time 540. Over time, as a user's likes and dislikes change, the user's determined preference for genres of television programming may update. In the example of table 500, the time period used for the analyzed statistics is about three weeks. A total percentage 550 may be calculated. Total percentage may be used to determine how much a user prefers a particular programming genre. Total percentage 550 may be computed using the total minutes 520 value for each genre.

While table 400 was created for a type of content and table 500 was created for genres of content, it should be understood that a similar analysis may be created for other characteristics of television programming, such as actors, actresses, directors, ratings, channel, time of day, day of week, etc.

The information from tables 400 and 500 may be used to assess whether television programs listed in EPG information stored by a television receiver may be liked by a user. For any show, a value can be calculated by, for example, adding the total minutes from tables 400 and 500 for the type and the first genre associated with the television program. The ten television programs calculated to have the highest value may have associated clips added to a customized preview video. Additional factors may also be taken into effect, such as actors, actresses, time of day, time of week, rating, directors, which specific television programs (from event name 310 of table 300) are the user's favorite programs. Further, user preferences can be taken into account. A user may weight type, genre, actors, actresses, time of day, rating, etc. For instance, a user could specify that the user prefers series to movies. Based on this, at least a certain number of clips for series may be added to the customized preview video.

Figure 6:
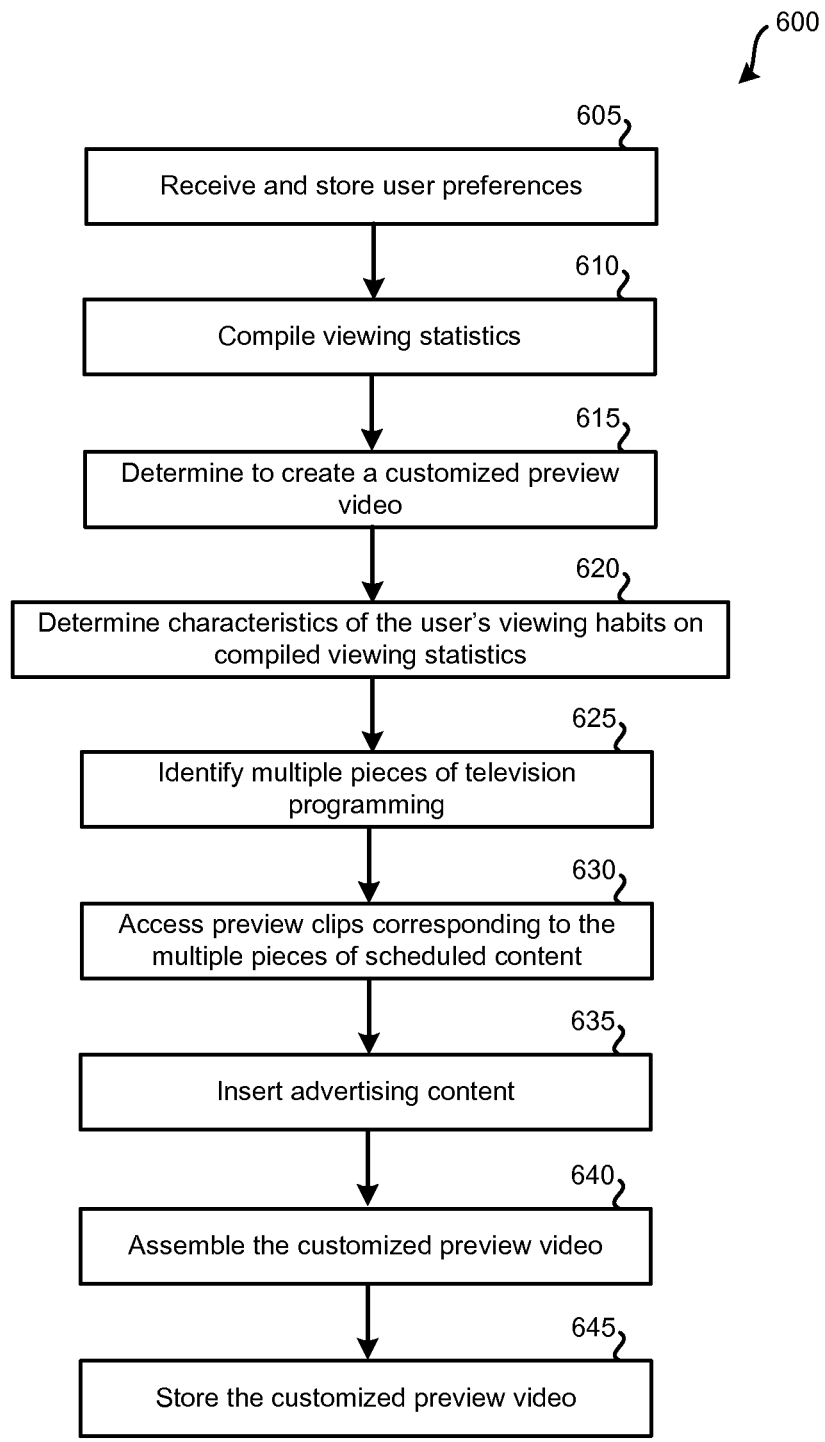
FIG. 6 illustrates an embodiment of a method for creating a customized preview video.

System 100 and television receiver 200 may be used to perform various methods. FIG. 6 illustrates an embodiment of a method 600 for creating a customized preview video. Method 600 may be performed by system 100 of FIG. 1. More specifically, each step of method 600 may be performed by a television receiver, such as television receiver 200 of FIG. 2. Further, performance of method 600 may involve the use of one or more computerized components, such as those detailed in relation to computer system 800 of FIG. 8.

At step 605, user preferences may be received and stored. The user preferences may be stored locally by a television receiver or may be stored remotely by the television service provider. The user preferences may define a profile for a user (such that only television programming viewed by the user is taken into effect in method 600) and may define the user's viewing preferences regarding content genre, content type, actors, actresses, directors, rating, etc.

At step 610, viewing statistics may be compiled. Compilation of viewing statistics may occur whenever a user has the television receiver outputting television programming. Statistics, such as in the form of table 300, may be measured and stored by the television receiver. The statistics may make use of characteristics of television programming detailed in associated EPG information. For instance, an EPG entry for a television program may indicate whether it is a movie or series (type) and a genre. An entry in a table (or other data structure) may be maintained for each television program (with a single entry for a series). An entry may only be maintained if a television program has been watched for at least a threshold period of time (e.g., 5 minutes). Accordingly, while a user is watching television via the television receiver, statistics may be compiled by the television receiver as to what the user is watching and how long the user has been watching it. The data may be maintained on a rolling basis. For instance, data may be aged out of the table (or other form of data structure) after the data is five weeks old. Alternatively, the table (or other form of data structure) may be periodically reset, such as once per month. The user may be permitted to manually reset the table or such a reset may periodically be performed by the television receiver.

At step 615, a determination may be made that a customized preview video is to be created. The determination may be in response to an event occurring. The event may be a request from a user that requests that a customized preview video be created. For instance, via a remote control, the user may indicate that he desires to view a customized preview video. The user's request may serve as the triggering event. The event may also be based on a predefined time occurring or elapsing. For instance, the television receiver may be configured to periodically generate a new customized preview video. A new customized preview video may be generated once a week, once per day, once per month, etc.

At step 620, characteristics of the user's viewing habits may be determined based on the compiled viewing statistics. As an example, table 300 of FIG. 3 may be used to determine table 400 and table 500. By analyzing the compiled viewing statistics, characteristics of the user's viewing habits related to type of content (e.g., series, live event, movie, etc.) and genre of content may be determined. Compiled viewing statistics may be analyzed as detailed in relation to FIGS. 4 and 5. Other characteristics may also be analyzed and determined. The characteristics may be at least partially based on an amount of time that a user has spent watching television programming of various types and genres. As previously detailed, besides types and genres, other characteristics of content as stored in associated EPG data may be determined.

At step 625, multiple instances of television programming to be included in a customized preview video may be identified. Television programs that will be broadcast or will otherwise be available (e.g., via on-demand) within a set period of time into the future may be analyzed. For instance, for possible inclusion within a customized preview video, the television program may be required to be scheduled for broadcast or become available within an upcoming week or ten days. The length of time into the future may be governed by the user (via user preferences), by the television service provider, and/or may be limited by how far into the future EPG data is available for television programs. Each television program may be analyzed that falls within the set period of time, has sufficient EPG data, and/or is included within the user's subscription. The analysis may be performed using the characteristics determined at step 620. For instance, for each piece of television programming at step 625, a point value may be assigned based on the determined characteristics. Referring, for example, to tables 400 and 500, if a television program is a movie and is science fiction, it may be assigned points, based on the total number of minutes associated with movies (406) and science fiction (274) for a total score of 680. Such a score may be computed for each television program. A defined number of television programs with the most points may be selected for inclusion in the customized preview video. It should be understood that the formula used to compute the point value may different significantly by embodiment and may be adjusted based on the stored user preferences of step 605. For instance, points may be weighted based on a rating. As an example, if a movie is R rated, its points may be multiplied by a factor, such as 0.8, while movies that are G rated may be multiplied by 1 (that is, left unchanged). Points may be assessed based on actors, directors, rating, time of day, whether broadcast or on-demand content, etc. The user, via user preferences, may be permitted to specify which factors are used to calculate points and a weight for each factor (e.g., a multiplier). It should be understood that calculation arrangements based on other factors than having the most points may be employed.

The total number of clips to be included in the customized preview video may be predefined or set by the user. For instance, the user could specify that the customized preview video is to be three minutes in length. If each clip is 30 seconds, this would mean that six clips are used to create the customized preview video. At step 630, preview clips for the appropriate number of top scoring clips may be accessed, based on the instance of television programming identified at step 625. The preview clips may be accessed locally or remotely. Preview clips may be accessed locally if the preview clips were transmitted to the television receiver. For instance, transmitted via a transponder of a satellite, and received via a tuner of the television receiver, preview clips for various television programs (e.g., the 100 most popular across the television service provider's network) may be recorded and stored. If accessed remotely, the television receiver may request and download the preview clips corresponding to the instance of television programming from the television service provider (e.g., from preview host 122 of FIG. 1). If the television program is stored locally by the television receiver, the television receiver may create a preview clip (either ahead of playback or during playback of the customized preview video). The preview clip may be constructed based on stored metadata that identifies portions of the television program to include in the preview clip.

The preview clips accessed at step 630 may vary even if a same series is repeatedly included within a customized preview video. For instance, the preview clip for a series may be based on the next episode of the series to be broadcast (or otherwise made available). A preview clip may also vary based on rating. If a user has set a rating limit, different preview clips for a same television program may be used. For instance, for a particular television program, a PG rated clip and an R rated clip may be available for use in a customized preview video.

At step 635, one or more pieces of advertising content may be inserted into the customized preview video. This advertising content may be content that otherwise would not be included in the user's customized preview video. For instance, a producer may pay a fee to the television service provider to include a clip of a television program in the user's customized preview video. The advertising content may be for television programming, a service, or a product. Such advertising content may be played before, during, and/or after the customized preview video.

At step 640, the customized preview video may be assembled. Assembly may include creating a video/audio file that combines multiple preview clips and, possibly, advertising content into a single video/audio file. In some embodiments, assembly may include creating a list of preview clips (and, possibly, advertising content) that indicates which clips are to be played. As such, no new video/audio file may be created, but rather a "playlist" of stored preview videos may be created. For such arrangements, the preview clips may be requested as needed for playback from a remote host. The ordering of the customized preview video determined during assembly may be based on the calculated points. For instance, the highest ranked television program to be included in the customized preview video may be added at the beginning (with others in descending order of points), at the end (with others in ascending order of points), or scattered (e.g., randomly distributed) throughout the customized preview video.

At step 645, the customized preview video may be stored by the television receiver until output is requested by a user. Playback may occur in response to a user request. In some embodiments, a request for playback may be received from a remote device of the user, such as a mobile device that accesses the customized preview video via the Internet or other network (e.g., local wireless network).

Figure 7:
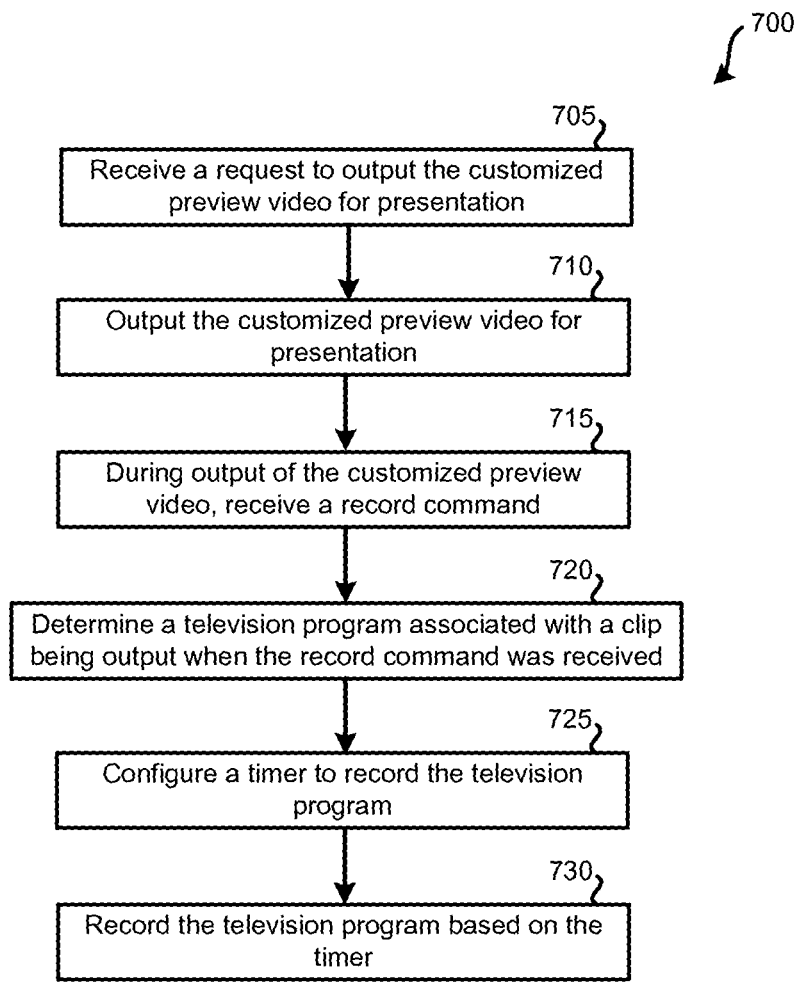
FIG. 7 illustrates an embodiment for presenting and using a customized preview video.

FIG. 7 illustrates an embodiment of a method 700 for presenting and using a customized preview video. Method 700 may be performed by system 100 of FIG. 1. More specifically, each step of method 700 may be performed by a television receiver, such as television receiver 200 of FIG. 2. Further, performance of method 700 may involve the use of one or more computerized components, such as those detailed in relation to computer system 800 of FIG. 8. Method 700 may be performed following method 600 of FIG. 6.

At step 705, a request may be received that indicates a customized preview video should be output for presentation. This request may be received from a user. In some embodiments, the customized preview video may be output for presentation in response to the television receiver being powered on. In some embodiments, when a user accesses an EPG guide (or other form of on-screen menu), the customized preview video may begin playing.

At step 710, the customized preview video is output for presentation in response to the request of step 705. Playback of the customized preview video may result in a single audio/video being played back. In some embodiments, based on a stored listing, various files of clips may be played consecutively to give the appearance of a single file being played back. One or more of these clips may be generated on the fly from a stored television program based on metadata that indicates which portion of the television program to use as a preview. In some embodiments, one or more clips may be retrieved and buffered for playback from a remote preview host.

While the customized preview video is being output, at least some EPG data for the associated television program may be displayed on screen concurrently with the clip. The EPG data may indicate the date, time, name of the television program, and/or the corresponding channel(s) associated with the clip.

At step 715, while the customized preview video is being output for presentation, a record request may be received from a user. The record request may express the user's intention to record the television program associated with the currently-playing clip of the customized preview video. The record request may be obtained from a remote control or from a mobile device being used to view the customized preview video, such as a cellular phone.

At step 720, the television program associated with clip being played when step 715 occurred may be determined. This determination may be based on metadata that was stored with the created customized preview video that identifies the start time, stop time, and associated television program for each video clip. If the customized preview video file is a reference file to other preview clips, the determination may also be based on which clip is currently being played back or is being streamed from a remote preview host.

At step 725, based on the television program determined at step 720, a timer may be configured based on stored EPG information to record the television program. This step may involve determining the time period, date, and channel for which the television program is scheduled to be broadcast and configuring the timer to cause recording at such a time. If the television program is a series, the user may have the option of causing all future episodes of the television program to be recorded. If the television program is on-demand and has a cost associated with it, the user may have the option to purchase the rights to watch the on-demand video. If a television provider set timer was already configured to record and maintain the television program for a period of time (e.g., one week), the user's record command may result in the television program being retained for a longer (e.g., indefinite) period of time. The piece of content may be recorded and stored by the television receiver at step 730.

Figure 8:
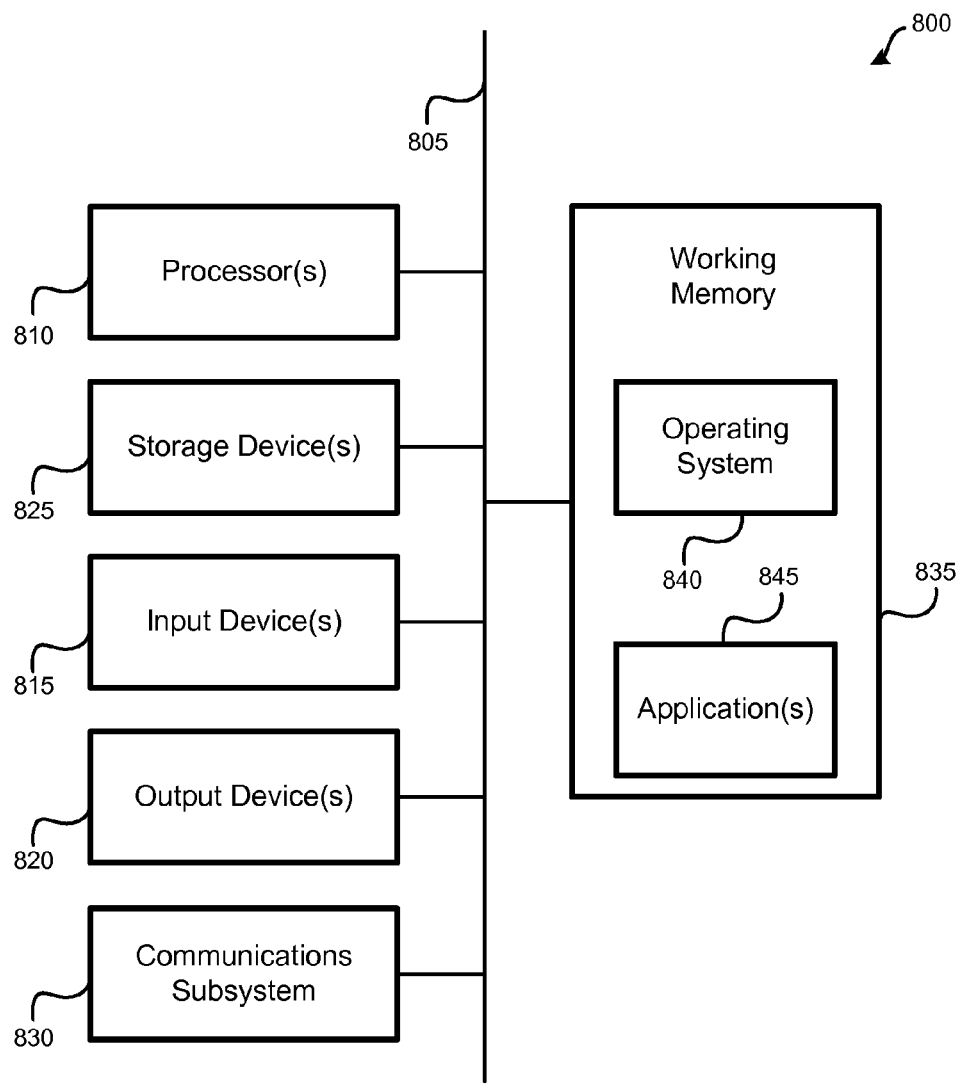
FIG. 8 illustrates an embodiment of a computer system.

A computer system as illustrated in FIG. 8 may be incorporated as part of the previously described computerized devices, such as the television receivers, the mobile devices, and the television service provider systems (and, more specifically, the preview hosts and EPG data hosts). FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device (e.g., corresponding to RAM 137 and/or ROM 136), as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein. Processor(s) 810 may correspond to processors 210 of FIG. 2.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network.

For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver for creating a customized preview video, the television receiver comprising:
   one or more tuners;
   one or more processors; and
   a memory communicatively coupled with and readable by the one or more processors and having stored therein processor-readable instructions which, when executed by the one or more processors, cause the one or more processors to:
   compile viewing statistics based on a plurality of television programs output for presentation, wherein the viewing statistics include an amount of time spent outputting for presentation each television program of the plurality of television programs;
   determine, based on an event, to create the customized preview video, wherein the event is a predefined time occurring or elapsing;
   determine, based on the viewing statistics for the plurality of television programs output for presentation, one or more preferred content types and one or more preferred content genres;
   identify using stored electronic programming guide data, a plurality of scheduled television programs, based on the determined one or more preferred content types and the determined one or more preferred content genres, wherein:
   the plurality of scheduled television programs are television programs to be broadcast on one or more television channels included in a subscription with a television service provider of a user linked with the television receiver; and
   the plurality of scheduled television programs are scheduled, by a television service provider, to be broadcast on the one or more television channels within an upcoming predefined period of time that is defined by the television service provider, the upcoming predefined period of time refers to a time period extending from a current time to a day in the future;
   record a plurality of preview clips via the one or more tuners of the television receiver;
   access the plurality of preview clips corresponding to the plurality of scheduled television programs that are scheduled to be broadcast on the one or more television channels within the television service provider-defined upcoming predefined period of time;
   create, at the television receiver, a locally-created preview clip of a locally-stored television program based on stored metadata that identifies a plurality of portions of the locally-stored television program to include in the locally-created preview clip; and
   assemble the recorded plurality of preview clips and the locally-created preview clip to create the customized preview video.

2. The television receiver for creating a customized preview video of claim 1, wherein the processor-readable instructions that cause the one or more processors to access the plurality of preview clips comprise processor-readable instructions which, when executed, cause the one or more processors to download one or more preview clips from a remote preview host.

3. The television receiver for creating a customized preview video of claim 1, wherein the one or more preferred content types are selected from the group consisting of: series, movies, and live events.

4. The television receiver for creating a customized preview video of claim 1, wherein the processor-readable instructions, when executed, further cause the one or more processors to output the customized preview video for presentation.

5. The television receiver for creating a customized preview video of claim 4, wherein the processor-readable instructions, when executed, further cause the one or more processors to:
  while the customized preview video is being output for presentation, process a record command received from a remote control;
  identify a television program corresponding to a preview clip of the plurality of preview clips currently being output for presentation; and
  create a timer to record the television program based on the stored electronic programming guide data.

6. A method for creating a customized preview video, the method comprising:
  compiling, by a television receiver, viewing statistics based on a plurality of television programs output for presentation, wherein
    the viewing statistics include an amount of time spent outputting for presentation each television program of the plurality of television programs;
  determining, by the television receiver, based on an event, to create the customized preview video, wherein the event is a predefined time occurring or elapsing or a user request;
  determining, by the television receiver, based on the viewing statistics for the plurality of television programs output for presentation, one or more preferred content types, one or more preferred content genres, or both;
  identifying, by the television receiver, using stored electronic programming guide data, a plurality of scheduled television programs to be broadcast by a television service provider, based on the determined one or more preferred content types, the determined one or more preferred content genres, or both, wherein:
    the plurality of scheduled television programs are television programs to be broadcast on one or more television channels included in a subscription with a television service provider of a user linked with the television receiver and within an upcoming predefined period of time that is defined by the television service provider, the upcoming predefined period of time refers to a time period extending from a current time to a time in the future;
  recording, by the television receiver, a plurality of preview clips corresponding to the plurality of scheduled television programs that are scheduled to be broadcast by the television service provider on the one or more television channels within the television service provider-defined upcoming predefined period of time by the television service provider;
  create, by the television receiver, a locally-created preview clip of a locally-stored television program based on stored metadata that identifies a plurality of portions of the locally-stored television program to include in the locally-created preview clip; and
  assembling, by the television receiver, the plurality of recorded preview clips and the locally-created preview clip to create the customized preview video.

7. The method for creating a customized preview video of claim 6, wherein the event is a request received from a user.

8. The method for creating a customized preview video of claim 6, wherein the event is based on a predefined schedule.

9. The method for creating a customized preview video of claim 6, wherein recording, by the television receiver, the plurality of preview clips comprises:
  downloading, by the television receiver, the plurality of preview clips from a remote preview host.

10. The method for creating a customized preview video of claim 6, wherein recordings, by the television receiver, the plurality of preview clips comprises: recording, by the television receiver, the plurality of preview clips via a tuner of the television receiver prior to determining to create the customized preview video.

11. The method for creating a customized preview video of claim 6, wherein the one or more preferred content types are selected from the group consisting of: series, movies, and live events.

12. The method for creating a customized preview video of claim 6, further comprising: outputting, by the television receiver, the customized preview video for presentation.

13. The method for creating a customized preview video of claim 12, further comprising:
  while the customized preview video is being output for presentation, receiving, by the television receiver, a record command;
  identifying, by the television receiver, a television program corresponding to a preview clip of the plurality of preview clips currently being output for presentation; and
  creating, by the television receiver, a timer to record the television program based on the stored electronic programming guide data.

14. A non-transitory processor-readable medium for creating a customized preview video, comprising processor-readable instructions configured to cause one or more processors to:
  compile viewing statistics based on a plurality of television programs output for presentation by a television receiver, wherein
    the viewing statistics include an amount of time spent outputting for presentation each television program of the plurality of television programs;
  determine, based on an event, to create the customized preview video, wherein the event is a predefined time occurring or elapsing or a user request;
  determine, based on the viewing statistics for the plurality of television programs output for presentation, one or more preferred content types and one or more preferred content genres;
  identify using stored electronic programming guide data, a plurality of scheduled television programs, based on the determined one or more preferred content types and the determined one or more preferred content genres, wherein:
    the plurality of scheduled television programs are scheduled to be broadcast by a television service provider on one or more television channels within an upcoming predefined period of time that is defined by the television service provider, the upcoming predefined period of time refers to a time period extending from a current time into the future;
  record a plurality of preview clips;
  create a plurality of locally-created preview clips of locally-stored television programs based on stored metadata that identifies a plurality of portions of the locally-stored television programs to include in the plurality of locally-created preview clips; and
  assemble the plurality of locally-created preview clips and the plurality of recorded preview clips to create the customized preview video.

15. The non-transitory processor-readable medium for creating a customized preview video of claim 14, wherein the processor-readable instructions are further configured to cause the one or more processors to output the customized preview video for presentation.

16. The non-transitory processor-readable medium for creating a customized preview video of claim 15, wherein the processor-readable instructions are further configured to cause the one or more processors to:
- while the customized preview video is being output for presentation, process a record command received from a remote control;
- identify a television program corresponding to a preview clip of the plurality of locally-created preview clips currently being output for presentation; and
- create a timer to record the television program based on the stored electronic programming guide data.

* * * * *